UNITED STATES PATENT OFFICE.

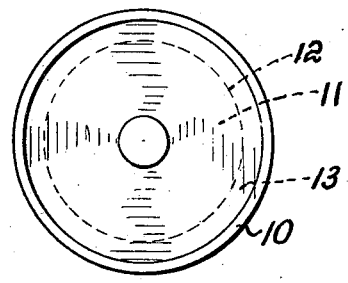
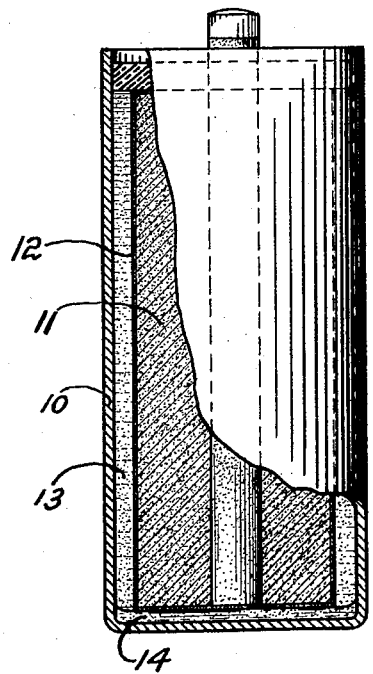

WILLIAM R. LOVEMAN, OF BRIDGEPORT, CONNECTICUT, ASSIGNOR TO THE BRIDGEPORT METAL GOODS MANUFACTURING COMPANY, OF BRIDGEPORT, CONNECTICUT, A CORPORATION OF CONNECTICUT.

ELECTRIC BATTERY.

1,408,525.   Specification of Letters Patent.   Patented Mar. 7, 1922.

Application filed July 31, 1920.   Serial No. 400,378.

*To all whom it may concern:*

Be it known that I, WILLIAM R. LOVEMAN, a citizen of the United States, residing at Bridgeport, county of Fairfield, State of Connecticut, have invented an Improvement in Electric Batteries, of which the following is a specification.

This invention relates more especially to flashlight batteries and produces an improved battery cell of the "bag" type.

An ordinary "bag" type battery cell comprises a cylindrical zinc shell or negative electrode, a carbon rod around which is tamped a mixture of manganese dioxide and graphite moistened with an exciting fluid, or positive electrode, a wrapping of gauze or cheese cloth which surrounds the positive electrode, a relatively thick layer of an electrolyte, usually a flour or starch paste containing varying percentages of an exciter, which fills the annular space between the electrodes, and a relatively thin disc of insulating material, usually composed of paper impregnated with paraffin, which separates the bottom of the zinc shell from the bottom of the positive electrode, the bottom of the zinc shell, it will be apparent, not being utilized in the battery action. The electrodes of cells constructed as set forth are of standard dimensions, as are also the flashlight casings for which the cells are intended. It is, consequently, essential that the completed cells be of substantially uniform and standard lengths.

The object of this invention is to provide a battery the cell of which, while of exactly the same dimensions as an ordinary battery cell of the present type, utilizes the bottom of the zinc shell in the battery action and thus increases the efficiency of the battery. To this end, I provide a cell which is in all respects similar to the ordinary cell, except that an electrolyte, of substantially the thickness of the insulating disc heretofore used, composed of a specially prepared paste is interposed between the bottom of the zinc shell and the bottom of the positive electrode as a substitute for said insulating disc.

The electrical resistance offered by an electrolytic paste is dependent upon the thickness of the paste as well as upon its chemical nature or structure. It will, therefore, be obvious that the relatively thin layer of paste which is to serve as a substitute for the insulating disc heretofore used must be of such nature or structure that it will offer a large amount of electrical resistance to the battery action. That is, in order that electrolytic action on the entire surface of the zinc may be uniform, it is necessary that the paste which separates the bottom of the zinc shell from the bottom of the positive electrode be of proper composition to make the electrical resistance of the cell through the thinner layer of paste equal to the resistance through the relatively thick layer of paste which fills the annular space between the electrodes.

In the accompanying drawing forming a part of this specification,

Fig. 1 is a top plan view of a battery cell in which are incorporated the features of the invention; and Fig. 2 is a side elevation, partially in section, of the cell of Fig. 1.

The improved cell comprises a cylindrical zinc shell or negative electrode, denoted by 10, a carbon rod around which is tamped a mixture of manganese dioxide and graphite moistened with an exciting fluid, or positive electrode, denoted by 11, a gauze or cheese cloth wrapping which surrounds the positive electrode, denoted by 12, a relatively thick cushion of electrolytic paste which fills the annular space between the electrodes, denoted by 13, and the electrolyte of the invention, denoted by 14, which separates the bottom of the zinc shell from the bottom of the positive electrode and consists of a specially prepared paste of such chemical composition that it will offer a great amount of electrical resistance to the battery action.

It is well known to persons skilled in the art to which this invention relates that it is possible to vary the chemical nature of pastes which are adapted to serve as electrolytes in battery cells of the present character so that the pastes will offer any desired resistance to the battery action.

The specially prepared paste of the invention is usually a form of hydrolized starch by-product which has been altered to have the proper chemical composition for its purpose, and is applied to the bottom of the zinc shell before the positive electrode is inserted.

What I claim is:

1. An electric battery comprising a negative electrode, a positive electrode located therein and spaced therefrom to provide an annular space between the electrodes, a cushion of electrolytic paste which fills said annular space, and an electrolyte of such character that it will offer relatively great resistance to the battery action located between the bottoms of the electrodes.

2. An electric battery comprising a negative electrode, consisting of a zinc shell, a positive electrode located therein and spaced therefrom to provide an annular space between the electrodes, a relatively thick cushion of electrolytic paste which fills said annular space, and a relatively thin layer of electrolyte which separates the bottoms of the electrodes from each other, said relatively thin layer of electrolyte being of such character that electrolytic action will be uniform upon the entire surface of the zinc shell.

3. An electric battery comprising a negative electrode consisting of a cylindrical zinc shell, a positive electrode located therein and spaced therefrom to provide an annular space between the electrodes, a relatively thick cushion of electrolytic paste which fills said annular space, and a relatively thin layer of electrolyte consisting of a layer of electrolytic paste of limited conductivity which separates the bottom of the zinc shell from the bottom of the positive electrode, said relatively thin layer of paste being of such character that electrolytic action will be uniform upon the entire surface of the zinc shell.

4. An electric battery comprising a positive electrode, a negative electrode, an electrolytic paste which fills an annular space between the electrodes, and a single layer of an electrolyte of specially prepared electrolytic paste which separates the bottoms of the electrodes from each other, said specially prepared electrolytic paste being of such composition that it will offer a large amount of electrical resistance to the battery action in order that electrolytic action will be uniform upon the entire surface of the negative electrode.

5. An electric battery comprising a positive electrode, a negative electrode, a relatively thick layer of electrolytic paste which fills an annular space between the electrodes, and a relatively thin layer of electrolyte of specially prepared electrolytic paste of limited conductivity which separates the bottoms of the electrodes from each other, said relatively thin electrolyte being of such composition that it will offer a large amount of electrical resistance to the battery action in order that electrolytic action will be uniform upon the entire surface of the negative electrode.

In testimony whereof I affix my signature.

WILLIAM R. LOVEMAN.